Dec. 30, 1924.                                    1,521,195
R. F. JOHNSON
LIQUID LEVEL INDICATOR
Filed Oct. 27, 1921
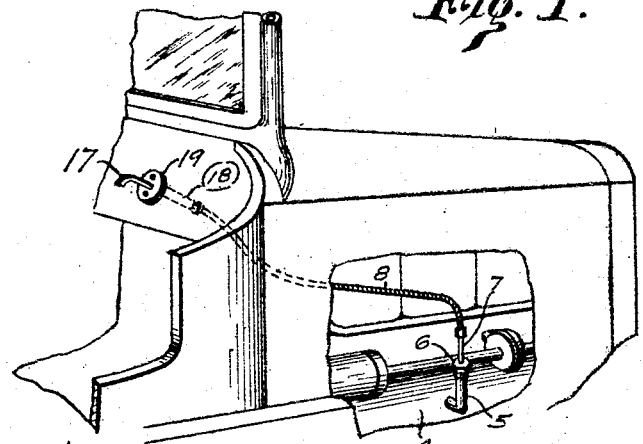
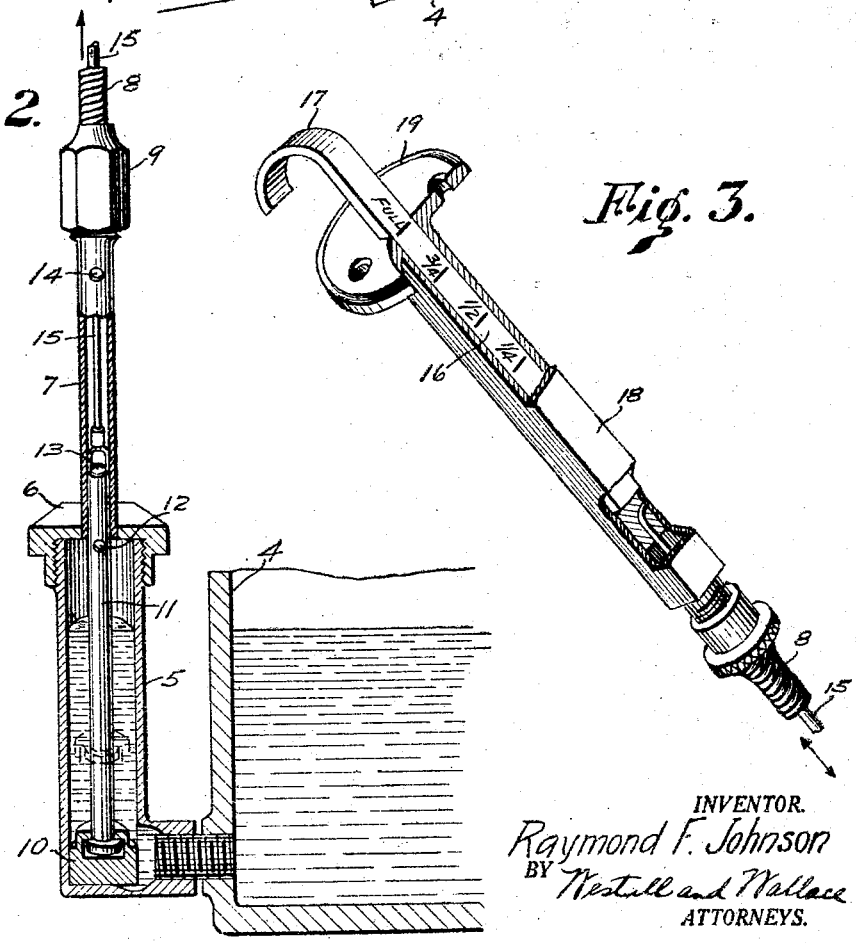
INVENTOR.
Raymond F. Johnson
BY Nestell and Wallace
ATTORNEYS.

73. MEASURING AND TESTING.

Patented Dec. 30, 1924.

1,521,195

UNITED STATES PATENT OFFICE.

RAYMOND F. JOHNSON, OF LOS ANGELES, CALIFORNIA, ASSIGNOR TO LOUIS A. COFFEY, OF LOS ANGELES, CALIFORNIA.

LIQUID-LEVEL INDICATOR.

Application filed October 27, 1921. Serial No. 510,804.

*To all whom it may concern:*

Be it known that I, RAYMOND F. JOHNSON, a citizen of the United States, and resident of Los Angeles, in the county of Los Angeles and State of California, have invented new and useful Improvements in a Liquid-Level Indicator, of which the following is a specification.

This invention relates to a liquid level indicator adapted to have the indicating parts which are read, located remote from the body of liquid whose level is to be indicated. The primary object of this invention is to provide a device operable at will to indicate the liquid level in a container. Another object of this invention is to provide a device having no delicate parts to get out of order and not dependent upon floats or the head of liquids for its operation. This invention depends upon entrapping a volume of liquid proportional to the level of the liquid in the container, and then determining the volume of the entrapped liquid. A further object of my invention is to provide a device, simple in structure, positive in its operation, and easily manipulated.

These objects together with other objects and corresponding accomplishments are obtained by means of the embodiment of my invention illustrated in the accompanying drawing, in which:

Fig. 1 is a perspective view of a fragment of an automobile, parts being broken away showing my improved indicator installed therein for the purpose of measuring the level of the oil in the crank case; Fig. 2 is an enlarged view in section showing the cylinder of the indicator; and Fig. 3 is an enlarged perspective view partly in section showing the scale portion of the indicator.

Referring more particularly to the drawing, a container, such as the crank case of an automobile engine is indicated by 4. Connected thereto by any suitable fitting is a cylinder 5. This cylinder is of a length at least that of the height of liquid when the container is full. The cylinder is placed with its axis in a vertical position, and communicates with the container, at its lower end. Secured to the top of cylinder 5 is a head 6. Secured to the head 6 is a tube 7 to which a tube 8 is connected by means of an adapter 9. Closely fitting within the cylinder 5 is a piston 10, which is secured to a hollow piston rod 11. The piston rod 11 has a sliding fit within the tube 7, with enough clearance to permit air to be forced through the clearance place but to check the flow of a liquid. In other words, the fit between the tube 7 and the piston rod 11 is a gas leak fit but a liquid tight fit. The thickness of piston 10 is such that when in its lower position, the inlet from the container 4 communicates with the space in the cylinder above the piston. Thus, when the piston is in its lower position, the upper portion of the cylinder and the container are in free communication so that the level of liquid will be the same in the container and in the cylinder. In order to permit the level in the cylinder and in the container to be equalized, an opening 12 is cut in the wall of the rod 11 to allow air to pass from the cylinder into the interior of the rod. The upper portion of the piston rod 11 has a yoke 13 so formed that air may pass from the interior of the piston rod into the tube 7 and out through an opening 14 therein. The opening 12 registers with the inside of cap 6 when piston 10 is in its lower position. Communication between the interior of the rod and cylinder is cut off when the piston rod is raised and at the beginning of its movement.

Secured to the yoke 13 is a flexible cable 15, which extends through the tube 8 and is connected at its other end to a scale 16. This scale consists of a rod having a hand hold 17 at its end. The scale is slidably mounted within a case 18 having a collar 19 arranged for fastening the case to the dashboard of an automobile. Marks are made upon the scale to indicate different degrees of fullness of the container.

The level of liquid in the container is indicated by grasping the hand hold 17 and pulling the scale outwardly until it comes to a stop. Pulling the scale 16 outwardly causes the piston to be moved outwardly. The piston overrides the port connecting container 7 and the cylinder and entraps the liquid in the cylinder 5 above the piston. The air above the liquid is easily forced outwardly around the clearance space between the piston rod 11 and the tube 7 due to the low specific gravity of air. Movement of the piston is checked as soon as all of the air has been forced out of the cylinder due to the relatively large area of surface offering resistance to the flow of fluid and due to the relatively high density of liquid as compared with air. Upon meeting with this check to movement the operator ceases to pull and the indicator on the scale is read. The position of the piston, which is indicated on the scale 16, is proportional to the level of the liquid in the container.

After a reading has been taken by means of the scale, the scale is moved back into its case thereby moving the piston to the lower limit of its travel and placing the cylinder and container in free communication.

What I claim is:

1. A device of the character described comprising a chamber adapted near its lower end for communication with a container holding liquid, a piston slidably mounted in the chamber so that when moved from the lower limit of its travel it will shut off communication between the liquid above it and that in said container and thereby trap such liquid in said chamber, a piston rod connected to said piston and extending through an opening in the head of said chamber, there being a space between said piston rod and the wall of said opening to allow free escape of gas but to impede the escape of liquid, and means associated with said piston rod to indicate the position of the piston.

2. A device of the class described comprising a cylinder adapted for communication at its lower end with a container holding liquid, a piston slidably mounted within said cylinder so that when in its lower position the upper portion of said cylinder above said piston is in free communication with said container, but when the piston is moved from its lower position it will shut off communication with said container and thereby trap such liquid in said cylinder, a piston rod connected to said piston and extending through an opening in the head of said cylinder, said piston rod having a port therein adapted to place the cylinder in communication with the atmosphere when the piston is at the lower limit of its travel and to be closed by the wall of the opening in the head when said piston is moved from the lower limit of its travel, there being a space between said piston rod and the wall of said opening to allow free escape of gas but to impede the escape of liquid, and means associated with said piston rod to indicate the position of the piston.

In witness that I claim the foregoing I have hereunto subscribed my name this 18th day of October, 1921.

RAYMOND F. JOHNSON.